US012662965B2

(12) United States Patent　　　　(10) Patent No.:　　US 12,662,965 B2

Aithal et al.　　　　　　　　　　　　(45) Date of Patent:　　Jun. 23, 2026

---

(54) LASER IGNITER, METHOD FOR IGNITING HIGH PRESSURE AND DILUTE FUEL-OXIDIZER MIXTURES

(71) Applicant: UCHICAGO ARGONNE, LLC, Chicago, IL (US)

(72) Inventors: Shashikant Aithal, Woodridge, IL (US); Sreenath Gupta, Naperville, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 672 days.

(21) Appl. No.: 17/944,148

(22) Filed: Sep. 13, 2022

(65) Prior Publication Data

US 2025/0215831 A1　　Jul. 3, 2025

Related U.S. Application Data

(60) Provisional application No. 63/249,928, filed on Sep. 29, 2021.

(51) Int. Cl.
*F02C 7/264*　　　(2006.01)
*F23Q 13/00*　　　(2006.01)

(52) U.S. Cl.
CPC ............ *F02C 7/264* (2013.01); *F23Q 13/005* (2013.01)

(58) Field of Classification Search
CPC .. F02C 7/26; F02C 7/264; F02C 7/266; F23Q 13/005; F02P 23/04
See application file for complete search history.

(56) References Cited

U.S. PATENT DOCUMENTS 5,367,869 A * 11/1994 DeFreitas ............... F02C 7/264
　　　　　　　　　　　　　　　　　　60/776
5,756,924 A * 5/1998 Early ...................... F02P 23/04
　　　　　　　　　　　　　　　　　　123/143 B
(Continued)

OTHER PUBLICATIONS

Bader Almansour, et al. "Performance of a Laser Ignited Multicylinder Lean Burn Natural Gas Engine," Journal of Engineering for Gas Turbines and Power, Nov. 2017, vol. 139, pp. 111501-7, US.

*Primary Examiner* — Devon C Kramer
*Assistant Examiner* — Sean V Meiller
(74) *Attorney, Agent, or Firm* — Foley & Lardner LLP

(57)　　　　　ABSTRACT

The invention provides method for igniting pressurized fuel, the method comprising placing fuel into a combustion chamber; mixing the fuel with supercritical carbon dioxide and oxidizer to create a mixture; and contacting the fuel-air mixture with a laser, whereby the laser is pointed to a first point within the chamber. Also provided is a laser ignitor for carbon dioxide combustors, the ignitor comprising: an elongated housing capable of varying in length, the housing having a first proximal end and a second distal end; a laser head in close spatial relationship to the proximal end, wherein the laser head generates a first laser beam; a seal at the distal end that is optically transparent to the laser beam and physically opaque to combustion contaminants; an algorithm for directing the first beam to a first point within a combustion chamber for a first period of time; and an algorithm for directing a second laser beam to a second point within the combustion chamber for a second period of time.

12 Claims, 18 Drawing Sheets

(56)     References Cited

U.S. PATENT DOCUMENTS

| | | | |
|---|---|---|---|
| 8,689,536 B2 * | 4/2014 | Kopacek | F02P 23/04 |
| | | | 60/776 |
| 11,047,310 B2 * | 6/2021 | Iwai | F02C 7/264 |
| 2014/0238038 A1 * | 8/2014 | Macchia | F02C 7/264 |
| | | | 60/39.821 |
| 2016/0094006 A1 * | 3/2016 | Hagita | H01S 3/106 |
| | | | 123/143 B |
| 2018/0023478 A1 | 1/2018 | Morisawa | |

* cited by examiner

51

| Calculated focal length (mm) | Solenoid |
| --- | --- |
| 300 mm | OFF |
| 150 mm | ON |

LASER IGNITER, METHOD FOR IGNITING HIGH PRESSURE AND DILUTE FUEL-OXIDIZER MIXTURES

PRIORITY

This Utility patent application claims the benefits of U.S. Provisional Patent Application No. 63/249,928, filed on Sep. 29, 2021, the entirety of which is incorporated herein by reference.

CONTRACTUAL ORIGIN OF THE INVENTION

This invention was made with government support under Contract No. DE-AC02-06CH11357 awarded by the United States Department of Energy to UChicago Argonne, LLC, operator of Argonne National Laboratory. The government has certain rights in the invention.

BACKGROUND OF THE INVENTION

1. Field of the Invention

This invention relates to efficient combustion technology and more specifically this invention relates to a method and device for igniting highly diluted and pressured fuel-oxidizer mixtures.

2. Background of the Invention

Interest in supercritical carbon dioxide ($sCO_2$) Brayton cycles is gaining momentum for a variety of power generation applications including fossil, nuclear, concentrated solar, and waste heat. The majority of these applications utilize indirectly heated $sCO_2$ cycles in which carbon dioxide ($CO_2$) in a closed loop is compressed, heated, and expanded to generate power. Compared to the steam Rankine cycles, the primary drivers for these $CO_2$ cycles are (1) increased power generation efficiency, (2) potential reduction in capital cost due to compact and simple plant configurations, and (3) reduction in water use.

Supercritical carbon dioxide ($sCO_2$) is a fluid state of carbon dioxide ($CO_2$) that is held above its critical temperature and critical pressure. $CO_2$ usually behaves as a gas in air at standard temperature and pressure (STP), or as a solid called dry ice when frozen. If the temperature and pressure are both increased from STP to be at or above the critical point for $CO_2$, it can adopt properties midway between a gas and a liquid. At this state, $sCO_2$ can be used efficiently throughout the entire Brayton combustion cycle.

$CO_2$ has a relatively low critical pressure of 7.4 megapascal (MPa), compared to 22 MPa for water, and a critical temperature of 31° C. As such, $CO_2$ can be compressed directly to supercritical pressures and readily heated to a supercritical state before expansion. In a heat engine, this can facilitate obtaining a good thermal match with the heat source. The critical temperature is also sufficiently high for ready heat rejection from the cycle at terrestrial ambient temperatures. Therefore, the system has a great potential for high efficiency since a large temperature difference is available. $CO_2$ near its critical point becomes more incompressible and hence, the compression work can be substantially decreased leading to high cycle efficiency.

In addition, in its supercritical state, $CO_2$ is also nearly twice as dense as steam. The high density and volumetric heat capacity of $sCO_2$ with respect to other working fluids make it more energy dense, meaning that the size of most system components such as turbines and pumps can be considerably reduced, which leads to a smaller plant footprint and possibly lower capital costs. $sCO_2$ is also generally considered an ideal working fluid because it is non-explosive, non-flammable, non-toxic, and relatively inexpensive.

In a simple closed-loop Brayton cycle, the working fluid ($CO_2$) is heated indirectly from a heat source through a heat exchanger (as steam would be heated in a conventional boiler); energy is extracted from the $CO_2$ as it is expanded in the turbine; the $CO_2$ exiting the turbine is then cooled in a heat exchanger to the desired compressor inlet temperature. After compression to the required pressure, the $CO_2$ is sent back to the heater to complete the cycle. At a turbine inlet temperature (TIT) of 700° C. and a turbine exit pressure of 8.27 MPa, maximum cycle efficiency is an estimated 34.5 percent.

The direct-fired supercritical carbon dioxide cycle offers the possibility of high-efficiency with almost 95 percent reduction in pollutant emissions while using standard fossil fuels. Various hardware associated with this cycle—combustors, turbines, heat exchangers, etc.—are being developed by several entities around the globe. To accommodate the high pressures (up to 300 bar), $sCO_2$ combustors constitute a liner enclosed in a casing. Following a practice that is traditionally used in gas turbines, Toshiba has developed a retractable spark igniter. (US Publication 2018/0023478 A1). Such an arrangement is limited to ignition at fairly low pressures (<30 bar). In the event of a flame blow out, the entire system must be purged of $CO_2$ and pressures brought down (from 300 bar) to values <30 bar to reignite and resume operation.

The problem with the environment surrounding Allam-Fetvedt direct-fired $sCO_2$) combustors is the extreme pressure associated therewith. At the higher pressures (e.g., above 50 bar) seen with Allam-Fetvedt cycle combustion scenarios, the gas between spark plug electrodes acts as an insulator, thereby increasing the voltage required for gas breakdown. Decreasing the spark gap is not an option as it results in the electrodes interfering with energy transfer from the spark kernel to the surrounding combustible gas mixture.

As such, typical spark plugs either foul, do not light, or flame out. Extreme fuel dilutions (e.g., $CO_2$ mole fractions of approximately 90 percent) exacerbate this problem.

There have been efforts to use a spark plug with extended electrodes, including a mechanism to retract the spark plug after successful ignition. Though this avoids perturbation of the combustor flow field by the ignition hardware, the ignitable pressures are still fairly low (~24 bar). Use of hypergolic chemicals to ignite the mixtures, as currently performed in rocket combustors, is a possibility. However, these chemicals tend to be highly toxic and difficult to handle, and often leave an undesirable residue.

A need exists in the art for a system and method for igniting pressurized, yet highly diluted fuel. The system and method should be robust enough to not flame out. The system and method should be adaptable to all potential designs of $sCO_2$ combustors while being at reasonable cost. Further the system should be adaptable to a myriad of combustion chamber pressures, ranging from approximately 4 bar to 300 bar.

SUMMARY OF INVENTION

An object of the invention is to provide a system and method for igniting and maintaining combustion in high pressure reaction zones that overcome many of the drawbacks of the prior art.

Another object of the invention is to provide a system and method for igniting advanced combustion cycles. A feature of the invention is combusting pressurized yet diluted fuel using a high pulsed laser focused into a narrow volume where the photon-molecule interaction increases with pressure. An advantage of the invention is that it offers higher efficiency (above 40 percent) with almost no emissions. For example, the invention facilitates the ignition of combustible mixtures at higher pressures (e.g., 300 bar) heretofore not possible with typical ignition systems.

Still another object of the invention is to provide a system and method for multi-pulse laser and volumetric ignition. A feature of the invention is the use of one or more lasers to selectively ignite fuel in specific regions of a combustion chamber. An advantage of the invention is that ignition probability of the fuel is improved by at least four fold, particularly for extremely diluted and pressurized fuel such as seen in supercritical $CO_2$ combustion scenarios.

Yet another object of the present invention is to provide a method and a system for facilitating ignition in open cycle paradigms. A feature of the invention is the use of remotely situated, multi-pulse lasers to selectively ignite fuel at specific locations within a combustion chamber. An advantage of the invention is that it provides enhanced fuel diversity, quicker restart in the event of a blow-off, and non-perturbation of combustor flow fields.

Another object of the present invention is to provide a variable method and system for facilitating laser ignition in combustion scenarios. A feature of the invention is the incorporation of lasers with in situ variation of focal lengths. An advantage of the invention is that various pressures within a combustor can be addressed using the same laser igniter so as to eliminate the need for several different igniters to accommodate different combustion chamber fuel pressures.

Briefly, the invention provides a method for igniting pressurized fuel, the method comprising placing fuel into a combustion chamber; mixing the fuel with oxidizer (e.g., supercritical carbon dioxide) to create a mixture; and contacting the mixture with a laser, whereby the laser is pointed to a predetermined point within the chamber.

Also provided is an ignition system for supercritical carbon dioxide combustors, the system comprising: an elongated housing capable of varying in length, the housing having a first proximal end and a second distal end; a laser head in close spatial relationship to the proximal end, wherein the laser head generates a laser beam; a seal at the distal end that is optically transparent to the laser beam and physically opaque to combustion contaminants; and a means for directing the beam to a predetermined point within a combustion chamber for a first period of time. The system may comprise a plurality of lasers (or a plurality of focal length adjustments for a single laser) to provide a second beam directed to a second point within the combustion chamber for a second period of time. The application of a second laser may be concomitant with the use of the first laser, or after the first laser is used. Each of the lasers may be mounted perpendicularly to the longitudinal axis of the combustion chamber, or parallel to the longitudinal axis of the combustion chamber, or both which is to say one laser mounted perpendicularly and another laser mounted axially.

BRIEF DESCRIPTION OF DRAWING

The invention together with the above and other objects and advantages will be best understood from the following detailed description of the preferred embodiment of the invention shown in the accompanying drawings, wherein.

DETAILED DESCRIPTION OF THE INVENTION

Figure 1:
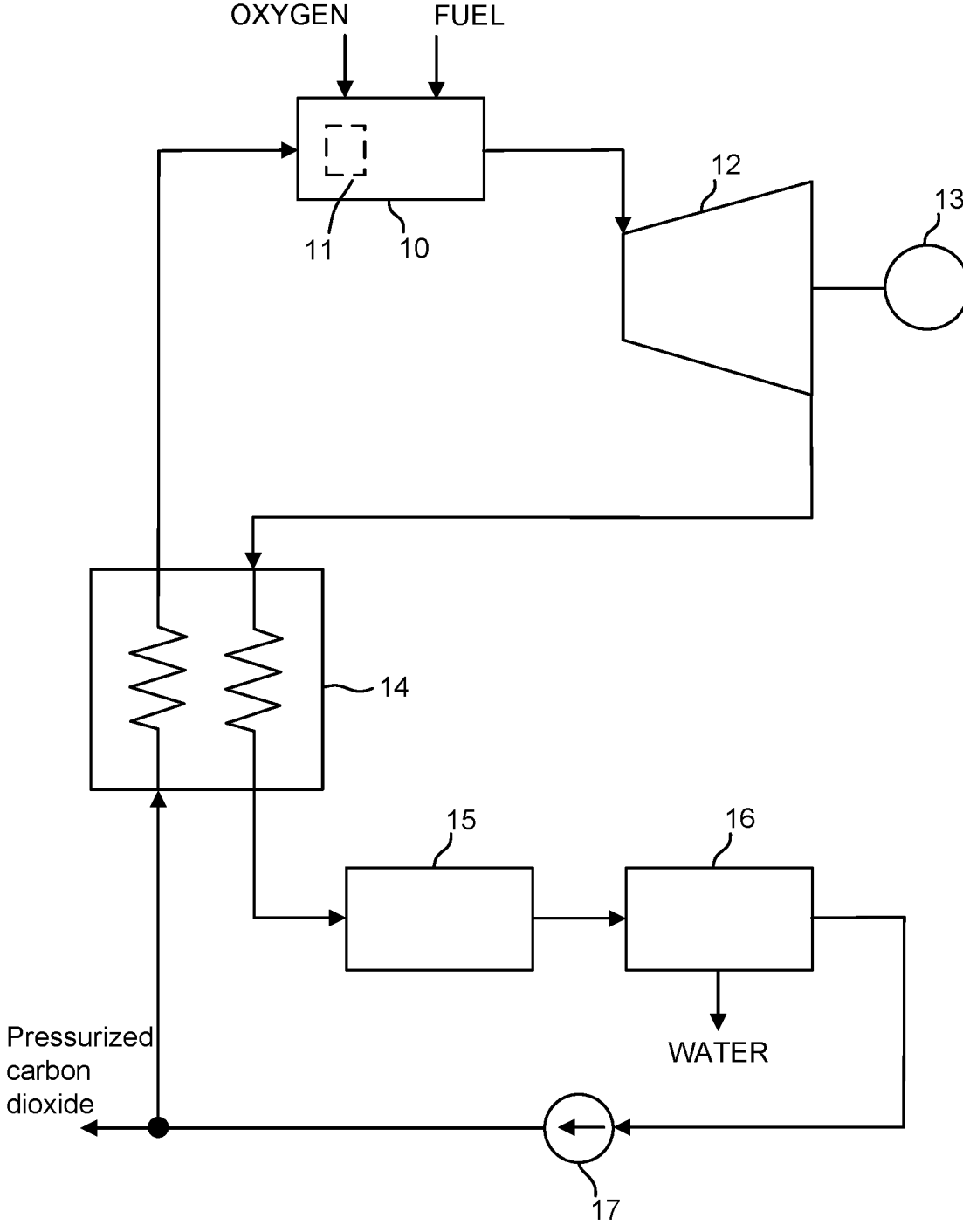
FIG. 1 is a schematic diagram of an Allam-Fetvedt Cycle.

The foregoing summary, as well as the following detailed description of certain embodiments of the present invention, will be better understood when read in conjunction with the appended drawings.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

The following detailed description should be read with reference to the drawings in which similar elements in different drawings are numbered the same. The drawings, which are not necessarily to scale, depict illustrative embodiments and are not intended to limit the scope of the invention.

As used herein, an element or step recited in the singular and preceded with the word "a" or "an" should be understood as not excluding plural said elements or steps, unless such exclusion is explicitly stated. As used in this specification and the appended claims, the term "or" is generally employed in its sense including "and/or" unless the content clearly dictates otherwise.

Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The invention provides a method and system for optimizing combustion of pressurized, yet highly diluted (up to 90 percent) fuel-oxidizer mixtures. It can be applied to both open and closed cycle systems. For example, it can be applied to open-cycle $sCO_2$ systems, i.e., Fetvedt-Allam cycle-based systems.

In open cycle systems, working fluid (e.g., air) is replaced again and again while flowing through the gas turbine. The cycle fluid takes part in the combustion. In closed system systems, the same working fluid is circulated again and again within the turbine. Heat is transferred to the working fluid using a heat exchanger.

A salient feature of the invention is that, even in extremely dilute and high pressure combustion environments, the invention improves ignition probability through spatial and temporal distribution of the ignition kernels within a combustion zone. Ignition is via laser beam at energies of less than 200 milli-Joules (mJ) per pulse. An embodiment of the invention utilizes a mechanical configuration that allows for in situ modification of the laser igniter's focal length.

The invention operates at temperatures between 30° and 900° C., and typically at approximately 400° C. The invention allows ignition at pressures between 4 bar and 300 bar. Typically, suitable combustion environments exist at pressures less than 300 bar, and most typically between 30 bar and 250 bar. (Spark plugs do not work in those operating conditions.) Also, the invented device has a projected service interval of between 40,000 and 50,000 ignitions. This compares to 5000 ignitions for state of the art igniters in gas turbine systems.

The igniter design illustrated herein provides a means to keep the igniter optics sufficiently clean to enable reliable ignition for several thousand hours, (e.g., typically 6000 hours in reciprocating engines without shut down or other intervention (e.g., maintenance and cleaning heretofore required in prior art systems).

An embodiment of the invention is utilized in Allam-Fetvedt Cycle combustion systems, of the type depicted in FIG. 1. The advantages of this paradigm are that it utilizes standard fuels (such as coal, natural gas, liquid phase fuels, and combinations thereof) at turbine inlet temperatures at or above approximately 1000° C. (e.g., 1050° C.) to provide cycle efficiencies of up to 50 percent (e.g., efficiencies of between 40 and 50 percent). No cooling water is required, and given the utilization of $sCO_2$, a relatively small foot print will suffice. An additional advantage is that $CO_2$ formed from combustion may be rendered as a separate pressurized stream that can be easily sequestered, or else reintroduced as $sCO_2$.

An exemplary open combustion system, such as the Allam-Fetvedt system, generally comprises a combustion chamber 10, a turbine 12 situated downstream of the chamber so as to mechanically actuate a generator 13, a recuperator 14 situated downstream of the turbine, a cooler 15 and condenser 16 for harvesting water, and a compressor 17 for re-pressurizing and redirecting $sCO_2$ back to the combustion chamber 10.

Figure 2A:
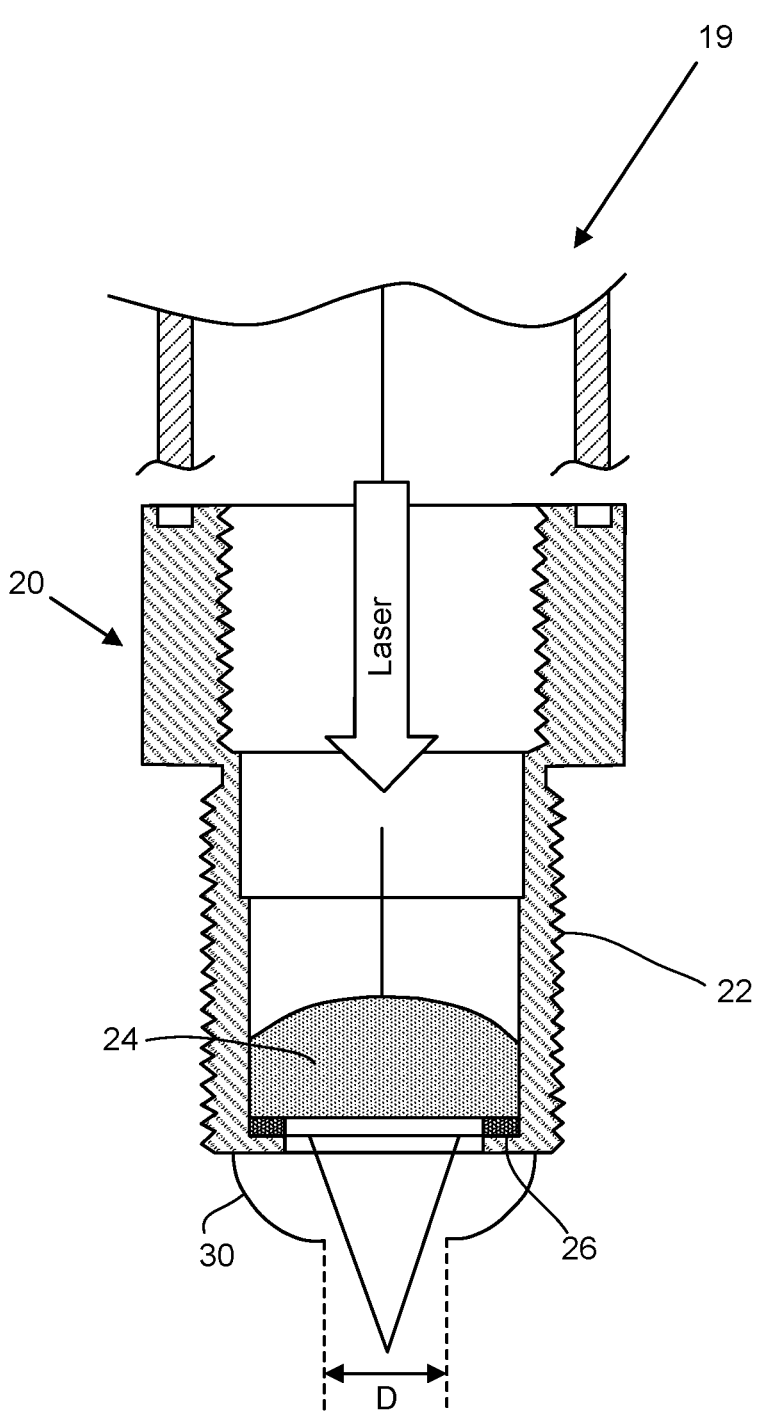
FIG. 2A is a cutaway of a laser igniter for use with $sCO_2$ combustors, in accordance with features of the present invention.
Figure 2B:
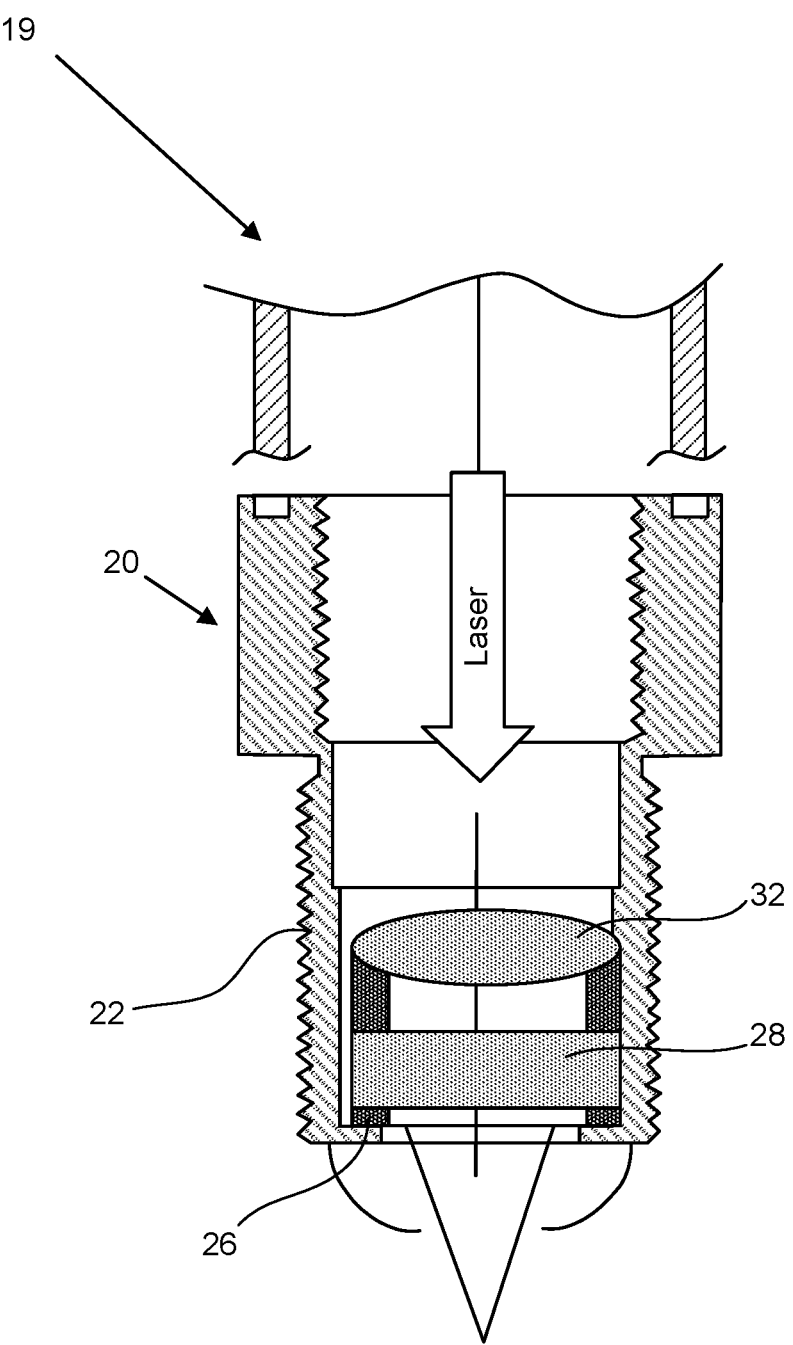
FIG. 2B is a cutaway of an alternate arrangement of the invented laser igniter for use with $sCO_2$ combustors, in accordance with features of the present invention.

FIGS. 2A and 2B depict the distal ends 20 of different laser ignitors 19 for $sCO_2$ combustors. The configurations depicted in FIG. 2 are generally configured for perpendicular engagement with a combustion chamber such that the longitudinal axis of the ignitor is perpendicular to the longitudinal axis of the combustion chamber. As such, the laser igniters extend radially from the exterior surface of the combustion chamber.

Both distal ends of the ignitors depicted in FIGS. 2A and 2B define circumferentially extending threaded surfaces 22 adapted to be received by threaded apertures found at typical spark plug locations or reciprocal engines or combustion walls of $sCO_2$ combustors. (For example, a 14 mm diameter threaded well accommodates a typical spark plug threaded configuration.) A sapphire lens 24 is disposed proximal to the distal end with an annular-shaped seal 26 (reminiscent of a washer) placed intermediate the lens and the distal end. The seal 26, which may be reversibly deformable, is provided to exclude combustion debris from the interior of the laser housing, and is typically made of copper, silver, gold, high temperature alloys, and combinations thereof. The sapphire lens may be pre-torqued so that a copper seal maintains an impermeable seal up to the anticipated pressures. Preferable pressures exceed 200 bar, with the seal maintaining integrity up to typical spark plug tip temperatures of approximately 700° C.

The distal end 20 of the laser further comprises a window 28 defining a diameter "D." The window typically comprises a material that can withstand high temperatures of lasers. Generally suitable materials are rigid substrates comprised of substances selected from the group consisting of, sapphire, aluminum oxynitride (ALON), diamond, and combinations thereof. Finally, the distal end of the laser housing terminates in a shield 30 configured to keep splattering of the lens by combustion debris to a minimum. The shield 30 is depicted as a depending dome, its center defining a single circular opening (with a diameter "D") to allow the laser beam to pass. However, other shapes are also envisioned, such as segments of a sphere (whereby a chord section of the sphere defines the opening), slits, ovoids, and combinations thereof. Furthermore, the laser beam opening may comprise a plurality of openings in the shield 30 to accommodate repositioning and refocusing of the laser beam from one region of the combustion chamber to another.

Figure 10:
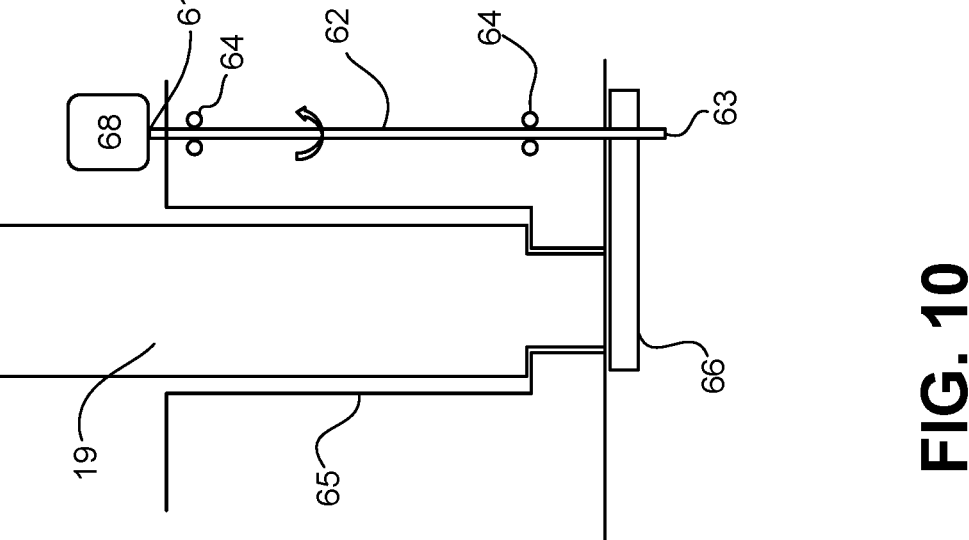
FIG. 10 depicts a shutter to confer additional protection to the distal end of a laser igniter, in accordance with features of the present invention.
Figure 10:
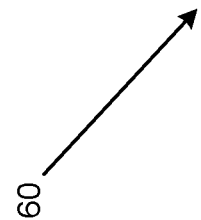

Optionally, an iris or gate valve can be used to provide additional shielding on the casing walls. FIG. 10 depicts a shutter device (generally designated as element number 60) for additional shielding for the igniter 19. A separate shaft 62 parallel to the axis of the laser igniter 19 penetrates the combustor housing 65. Appropriately placed seals 64, contain the combustor gases, while allowing the shaft to rotate. The shaft carries a plate 66, comprised of a temperature resistant material such as steel, alloy, ceramic, that is mechanically fixed at the distal end 63 of the shaft. The plate 66 may be welded or fixed using a fastener to the distal end 63.

The plate 66 acts as a shutter. At the proximal end 61, the shaft is mechanically fixed to a motor or rotary actuator 68. Prior to laser firing, the plate 66 is rotated or otherwise moved away from the laser igniter opening by actuating the motor/actuator.

FIG. 2B shows a different embodiment for a perpendicularly positioned (relative to the longitudinal axis of the combustion chamber) igniter. FIG. 2B depicts a quartz substrate 32 disposed between the laser beam source and the window 28. The quartz substrate 32 is the actual lens that is focusing the laser. The sapphire window 28 acts as the pressure barrier with 300 bar on one side and 1 bar on the other side.

Figure 3:
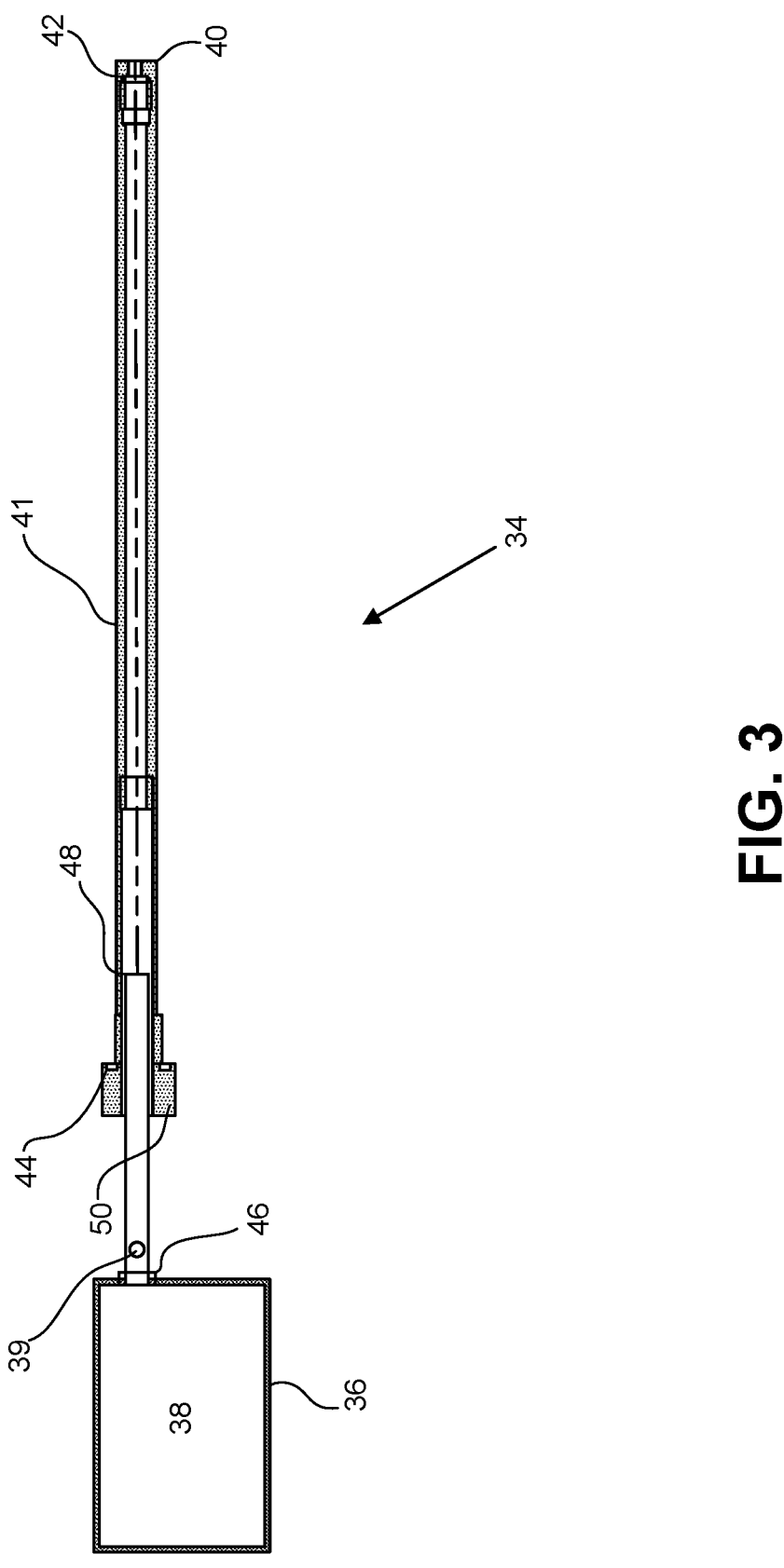
FIG. 3 is a cutaway of an axial laser ignitor, in accordance with features of the present invention.

FIG. 3 depicts a laser ignitor generally designated as numeral 34. It is designed to engage in a coaxial configuration with the longitudinal axis of a typical combustor, thus any such combustor is not considered part of the invention.

The axially aligned embodiment 34 generally comprises a first proximal end 36 terminating in a laser head 38 and a second distal end 40 terminating in an end cap 42. (The end cap 42 is provided to shield the optical surface from contaminants introduced by combustion.) The endcap serves an additional function of imparting initial stress to the seal. When the igniter end is heated to very high temperatures (e.g. 1000° C.) most of the stress is relieved due to expansion of the ignitor housing material. The initial stress that is imparted ensures a functional seal even at high temperatures.

A longitudinally extending portion comprising a laser module housing 41 is disposed between, and therefor physically connects, the proximal and distal ends.

The ignitor housing may include a telescoping means to ensure that alignment of the laser beam with the sapphire window 28 situated downstream from the laser and within the longitudinally extending portion 41. The telescoping arrangement is a tube-sliding-in-a-tube arrangement. This helps laser beam alignment, and also isolates or dampens longitudinal vibrations from the combustion chamber back to the laser head.

As depicted in FIG. 3, the telescoping feature comprises a piston-tube arrangement, wherein a distal end 48 of the piston is slidably received by a proximal open end 50 of the elongated substrate 41. The telescoping arrangement may also be described as a small diameter tube received by a relatively larger diameter tube. This large diameter tube adapted to receive a small diameter tube configuration further provides a means for fully encapsulating laser beam radiation, thereby preventing inadvertent exposure to personnel or adjacent equipment.

Intermediate the laser head 38 and the distal end 40 is a seal 44, adapted to be threadably received by a combustor housing. This eliminates the need for positioning seals at or proximal to the high temperature combustion housing. Rather, low temperature, and therefore less expensive sealing substrate may be utilized.

Intermediate the seal 44 and the laser head 38 is a decoupler 46 which provides a means for physically separating the laser head from the longitudinally extended housing. This decoupling occurs after the laser is aligned and fixed in position relative to the region within the combustion chamber with which the laser beam is to interact. This decoupling mechanism reduces heat transfer from the combustion venue back to the laser head. As such, it serves as a means for interrupting the thermal conductance from the distal to the proximal end of the ignitor.

A photodiode may be utilized to confirm the operation of the laser when trying to ignite under difficult conditions. By confirming the operation of the laser, the troubleshooting can then be directed towards other potential causes. For example, sometimes, the laser could be firing and creating a spark but the local combustion conditions would not result in the spark transitioning to a flame. The photo diode provides a means for confirming spark/flame conditions.

Optionally, the laser head operates in burst mode to improved ignition probability. Multi-pulse and volumetric ignition is made possible with the invention by contacting specific regions of a combustion chamber with bursts of laser energy (e.g., 50 Hz). For example, the invention enables the generation of 20 laser pulses at 50 Hz. As such, a wait time of only two seconds is required before firing the next round of laser bursts.

Figure 4A:
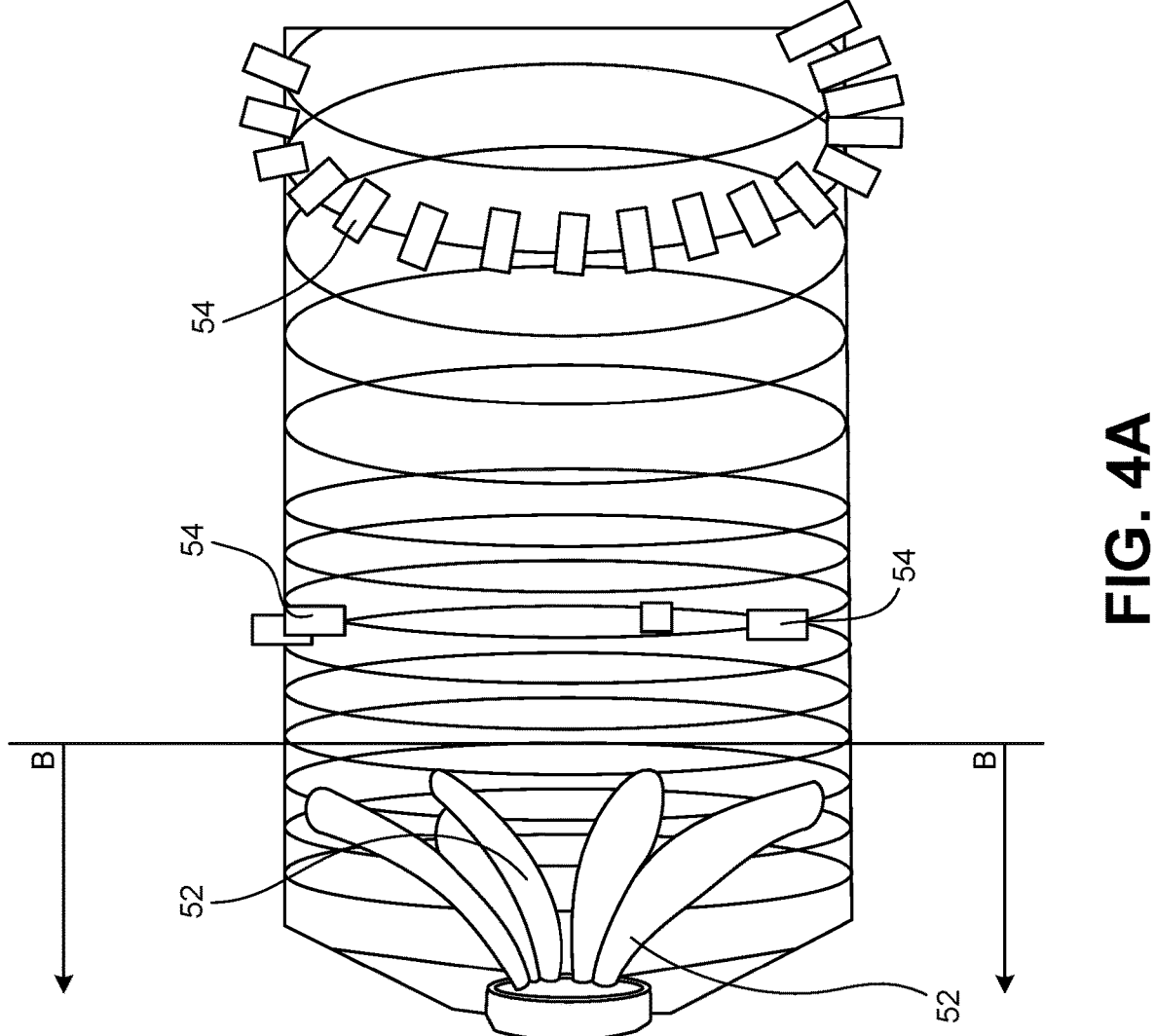
FIG. 4A schematically shows a side view of fuel dispersion nodes or concentrations within a combustion chamber, in accordance with features of the present invention.
Figure 4B:
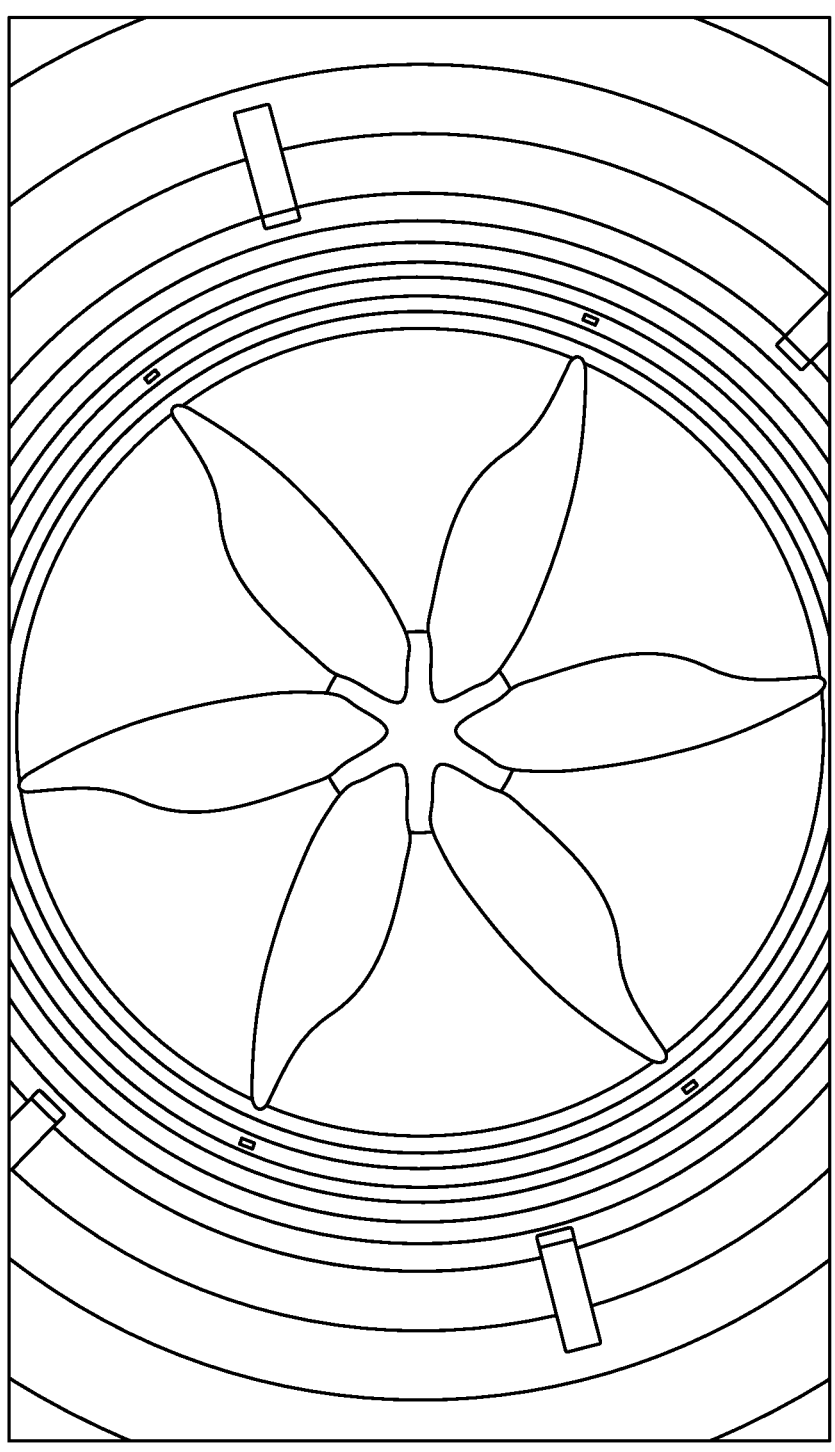
FIG. 4B is a view of FIG. 4A taken along line B-B and shows the front view of fuel dispersion nodes or concentrations within a combustion chamber, in accordance with features of the present invention.

The invented laser ignitor carries a lens of sufficient focal length to focus the burst and create a plasma kernel at an optimal location in the fuel-oxidizer mixture, said location in close proximity to the fuel-air mixtures satisfying predetermined ignition criteria depicted in FIGS. 4A-B. The laser pulse has sufficient peak power to ensure this mode of laser breakdown ignition (LBI) In combustor geometries that allow alternate ignitor placement, the laser is focused onto a solid surface, thereby creating a plasma kernel via laser ablative ignition (LAI) LAI provides the means for ignition using a smaller and less expensive laser. Suitable focal lengths of the lasers may range from 50 mm to 200 mm, preferably between 75 mm and 150 mm, and most preferably between 100 mm and 120 mm. The telescopic function facilitates alignment of the laser beam with the lens. For example, the telescopic function provides a means for maintaining the laser beam collinearly with the axis of the lens without any lateral or angular offsets. The tube in tube configuration of the telescopic feature also provides a means for providing a physical barrier between the laser beam and adjacent instrumentation or personnel.

The invention enables the utilization of fuels, including standard fuels such as coal, natural gas, liquid phase hydrocarbons, and mixtures thereof. Efficiencies approach 50 percent such that near zero emissions are obtainable, and with concomitant sequestration of carbon. Also, no cooling water is required.

Two modes of laser ignition may be utilized: Laser Breakdown Ignition (LBI) and Laser Ablation Ignition (LAI), the latter of which uses ¼₀th the power. For example, while LBI may require 40 W power for a laser, LAI may only require 1 W of power. In combination with computational fluid dynamics (CFD), LBI can selectively ignite fuel-oxidizer mixtures at the most conducive locations (calculated using the algorithm provided herein) where the fuel-oxidizer is optimal for ignition, for example where high concentrations of fuel dwell inside the combustion chamber. (CFD, discussed infra, enables computer modeling of combustion fluid flows and so is used to infer flow field information such as fuel mole-fractions, temperatures and velocities.)

The invention provides a means for focusing a laser beam at each node (i.e., each area of optimal fuel-oxidizer concentration) of a predicted fuel dispersion. For example, the invention allows for focusing a laser beam in close proximity of each volume of a predicted fuel-air mixture which satisfies an ignition criteria. FIGS. 4A-4B show a show a plurality of fuel nozzles 52 dispensing fuel every 60 degree intervals within a combustion chamber. Radially projecting conduits 54 are provided downstream of the nozzles 54 as a means to introduced sCO$_2$.

An algorithm (Equation 1 infra) is utilized to anticipate the location and duration of each fuel node so as to direct a laser beam to contact it Input data for the algorithm include fuel velocity, fuel/air mixture, pressure, temperature, and combinations thereof. The fuel is dispensed continually through the 60 degree intervals, i.e., all the time.

$$\varphi = \frac{\frac{F}{Ox}}{\left(\frac{F}{Ox}\right)_{stole}} \qquad \text{Equation 1}$$

wherein F is the mass fraction of fuel, and Ox is the mass fraction of oxidizer.

For the case of the fuel mixture consisting of CO and H2 mixture, Equation 2 may be utilized.

$$\phi = \frac{Y_{H2} + Y_{co}}{2} \qquad \text{Equation 2}$$

where $Y_{H2}$ and $Y_{CO}$ are the mass fractions of the H2 and CO respectively. Similar relationships can be written for other fuel mixtures based on their combustion chemistry.

Other injector designs which do not have the 60 degree interval would also work—the CFD simulations of the combustor would identify regions satisfying the ignition criteria. For instance, there could be 4 injectors at the 12 O clock, 3 O clock 6 O clock and 9 O clock positions-so there would be 4 "petals" instead of 6 perhaps with a different shape/contour than that shown in FIG. 4A-4B which would satisfy our "ignition criteria".

The algorithm provides a means for focusing a laser beam at optimal locations within the combustor flow field that have equivalence ratio, $\phi$ (defined by Equation 1), within ignitable limits (0.7 to 1.62 for coal derived syngas, 0.5 to 2.0 for natural gas), dilution by carbon dioxide low, and flow velocity <30 m/s. The nodes shown in FIGS. 4A-4B represent regions where $\phi$ lies between 0.95 and 1.05.

The invented burst-laser paradigm, wherein the laser shines within the combustion chamber only at the point and time containing optimal fuel-oxidizer ratios, improves overall combustion probability. For example, each laser pulse may result in approximately 10 ignition kernels spread over 25 mm close to the focal point of the lens. While this spatial distribution helps improving ignition probability, the laser may be used in burst mode. In this mode of operation, the laser emits a 20 short pulses in a sequence (5 ns wide pulses once every 20 milliseconds). The resulting 10×20=200 ignition kernels are distributed over space as well as time improving the interaction with the fuel-air mixture, thereby improving the probability of ignition.

Times of laser exposures on each region of fuel concentration can vary from 0.1 nanosecond (ns) to 50 ns, and typically from 0.25 ns to 25 ns, and preferably from about 0.5 ns to 15 ns. The inventors envision a typical time window of between about 0.6 to 10 ns.

Example

Using HPC resources at Argonne National Laboratory, a 60 degree sector of a 50 50 megawatts thermal (MWTh) sCO$_2$ combustor featuring a fixed focal point laser was modeled for the steady state flow field prior to combustion. Simulations were performed using coal derived syngas-oxidizer mixtures at 20 bar pressures that was representative of initial system startup, and 300 bar pressure that was representative of the full-load operation. Careful consideration of the temperature, velocity, local equivalence ratio and CO$_2$ fields suggested optimal placement of the plasma ignition kernel to be away from the walls and within the iso-volumes for the equivalence ratio 0.95-1.05. This in turn provided estimates for the laser igniter dimensions as well as its optimal placement on the combustor casing.

Subsequently, a laser igniter was developed that could withstand 300 bar pressure, and could focus pulsed emission emanating from a Nd:YAG laser 50 to 165 mm away.

The laser igniter was tested in a static chamber at room temperature prefilled with premixed gaseous mixtures of syngas and oxidizer. The igniter proved successful over a wide range of equivalence ratios, $\phi$=0.7 to 1.6, and for initial pressures up to 40 bar. These tests also showed that multiple ignition kernels form at the focal point along the laser line of sight. Both volumetric ignition and use of multiple ignition pulses (i.e., burst mode) significantly improve ignitability.

The inventors have designed a laser ignitor that can ignite multiple times, such that re-ignition can occur within two seconds of flame out. This example includes results from high fidelity CFD modeling of the flow field within a 50 MWTh combustor.

The experimental arrangement was similar to that of a typical gas turbine combustor wherein the fuel is introduced through a nozzle at the center and a co-flowing oxidizer stream is introduced concentrically using a swirler or some other mixing means. Both the oxidizer and the fuel streams have CO$_2$ added as a diluent to significantly reduce the combustion temperature. Additionally, CO$_2$ as a diluent is introduced along the length of the liner to keep it cool, and radially inward in the secondary and tertiary combustion zones to limit the combustor exit temperatures, i.e., turbine inlet temperatures to 1150° C.

Using the combustor geometry mentioned above CFD modeling of steady state flow fields prior to ignition was performed at 20 bar which was representative of conditions during plant startup, and at 300 bar which was representative of the combustor full load conditions.

Figure 5:
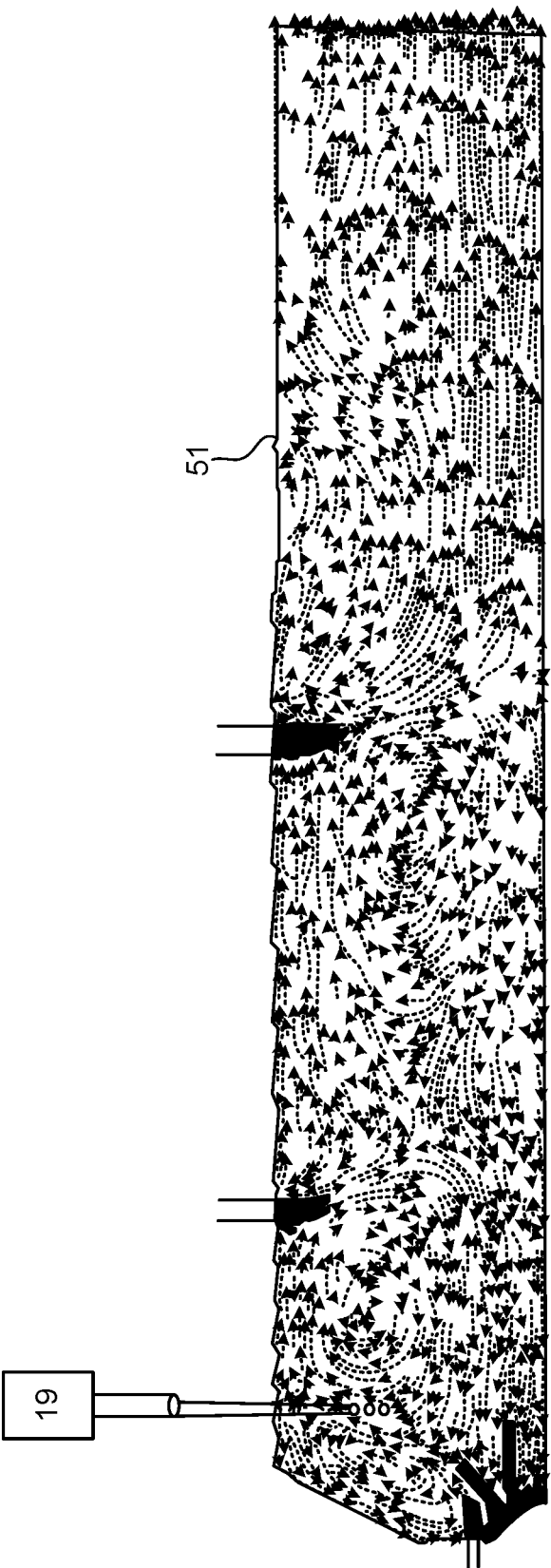
FIG. 5 is a flow field at 20 bar in simulated experiments for a given combustor geometry and fuel/oxidizer/dilution injection conditions, in accordance with features of the invention.

FIG. 5 depicts a steady state flow field of a combustion chamber featuring a laser beam perpendicularly interacting therewith and a diluent hole 51. Specifically, FIG. 5 shows the laser ignitor 19 positioned at the top left corner of the combustion chamber so as to be positioned at approximately a 90 degree angle to the longitudinal axis of the chamber. In this instance, the beam is medially directed and downwardly directed into the chamber. Acceptable angles of attack of the incoming laser beam range from 0 degrees to 120 degrees relative to the longitudinally-extending wall of the combustion chamber.

The steady state flow field at 20 bar (FIG. 5) exhibited multiple recirculation zones. The velocity vector arrows in the figure show several recirculation zones in flow.

FIG. 5 exhibits a cutting plane θ of 75 degrees. (FIG. 5 represents a 20 bar flow field. To reduce computational burden, and to leverage the symmetric nature of the combustor, CFD was performed only in a ⅙, i.e., 60 degree sector.

Figure 6A:
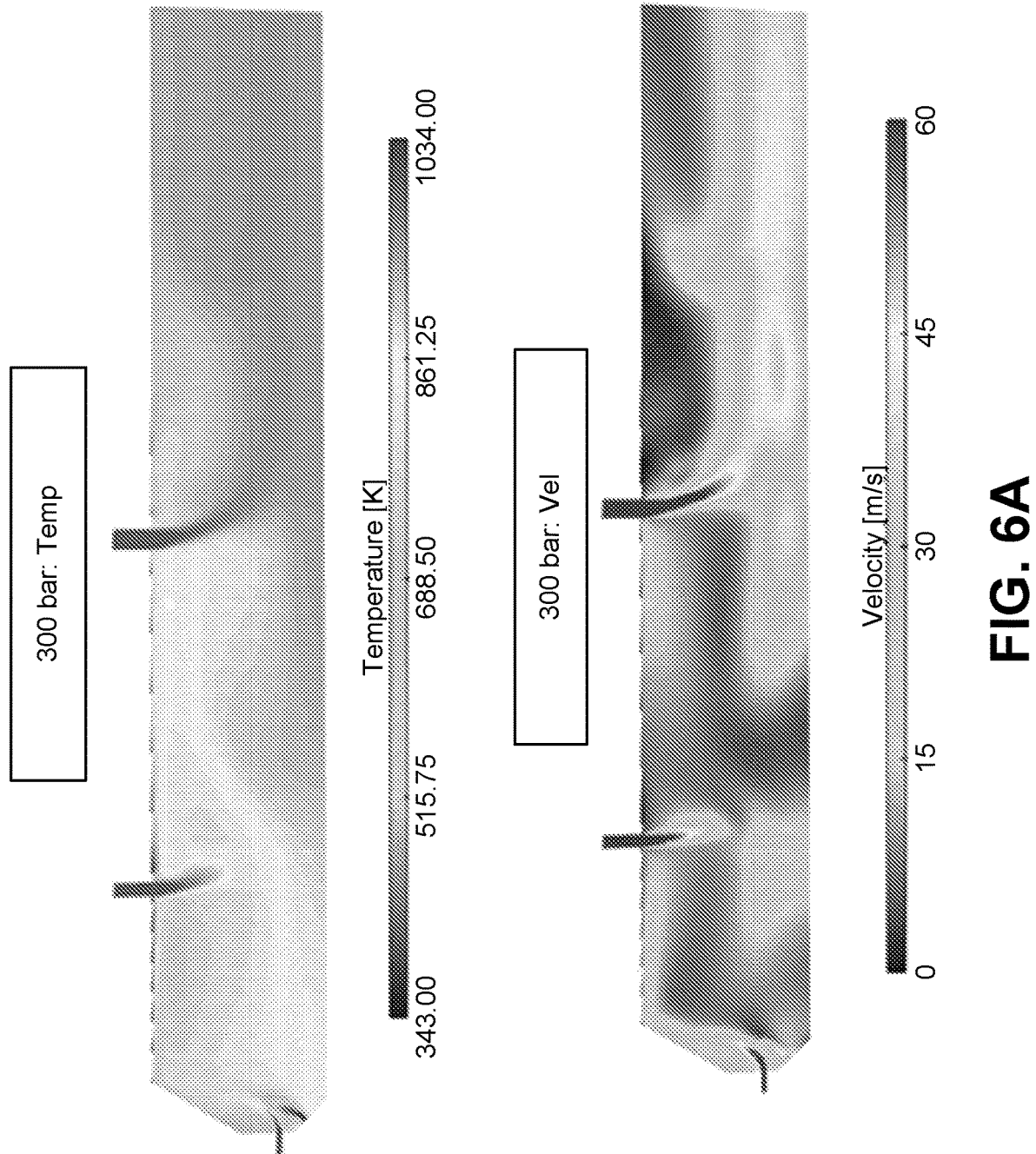
FIG. 6A depicts steady state fields for temperature and velocity at 300 bar for a given combustor geometry and fuel/oxidizer/dilution injection conditions, in accordance with features of the present invention.
Figure 6B:
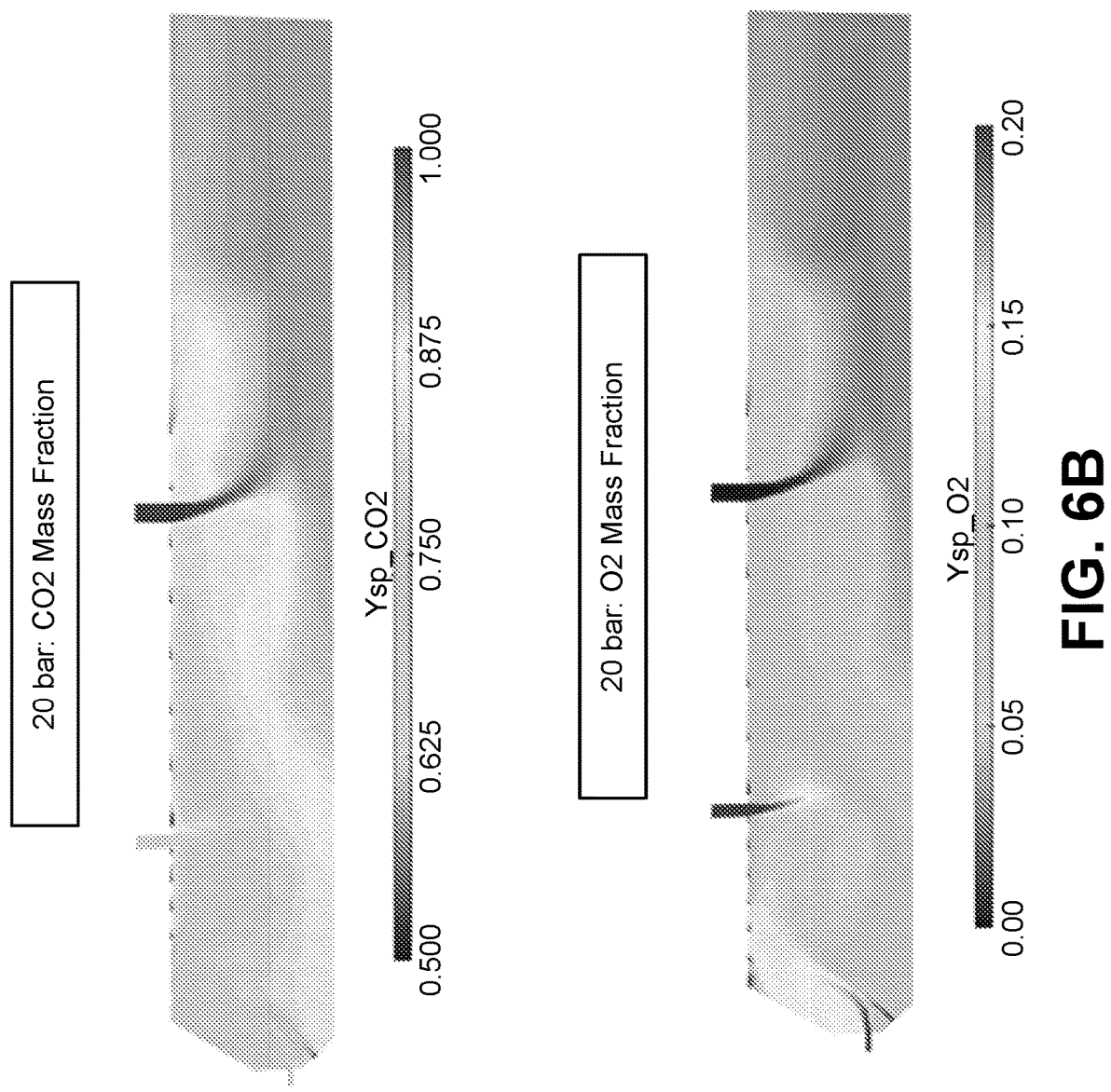
FIG. 6B depicts $CO_2$ concentration and $O_2$ concentration at 20 bar for a given combustor geometry and fuel/oxidizer/dilution injection conditions, in accordance with features of the present invention.

The associated fields for $CO_2$, $O_2$, temperature and velocity are shown in FIGS. 6A-B. FIG. 6A shows steady state fields for temperature and velocity at 300 bar. FIG. 6B shows steady state fields for $CO_2$ and $O_2$ fields at 20 bar. The figure exhibits a cutting plane θ of 75 degrees.

Figure 7:
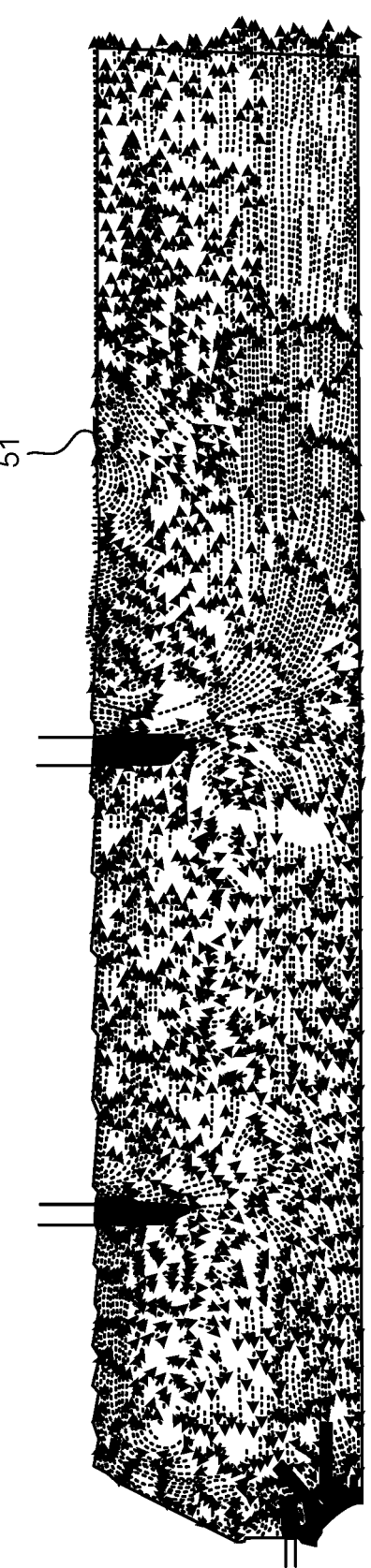
FIG. 7 is a flow field at 300 bar in simulated experiments for a given combustor geometry and fuel/oxidizer/dilution injection conditions, in accordance with features of the invention.

The flow fields for the 300 bar case (see FIGS. 7 and 8) were somewhat similar to those in the 20 bar case. (As in FIG. 5, the laser ignitor is perpendicularly positioned.) On the other hand, as shown in FIG. 7, the flow velocities were higher closer to the liner walls. (FIG. 7 represents a 300 bar flow field with a cutting plane θ=75°.) This necessitates placement of the plasma kernel inside the petal like region of the equivalence ratio iso-volumes to ensure successful ignition.

Figure 8A:
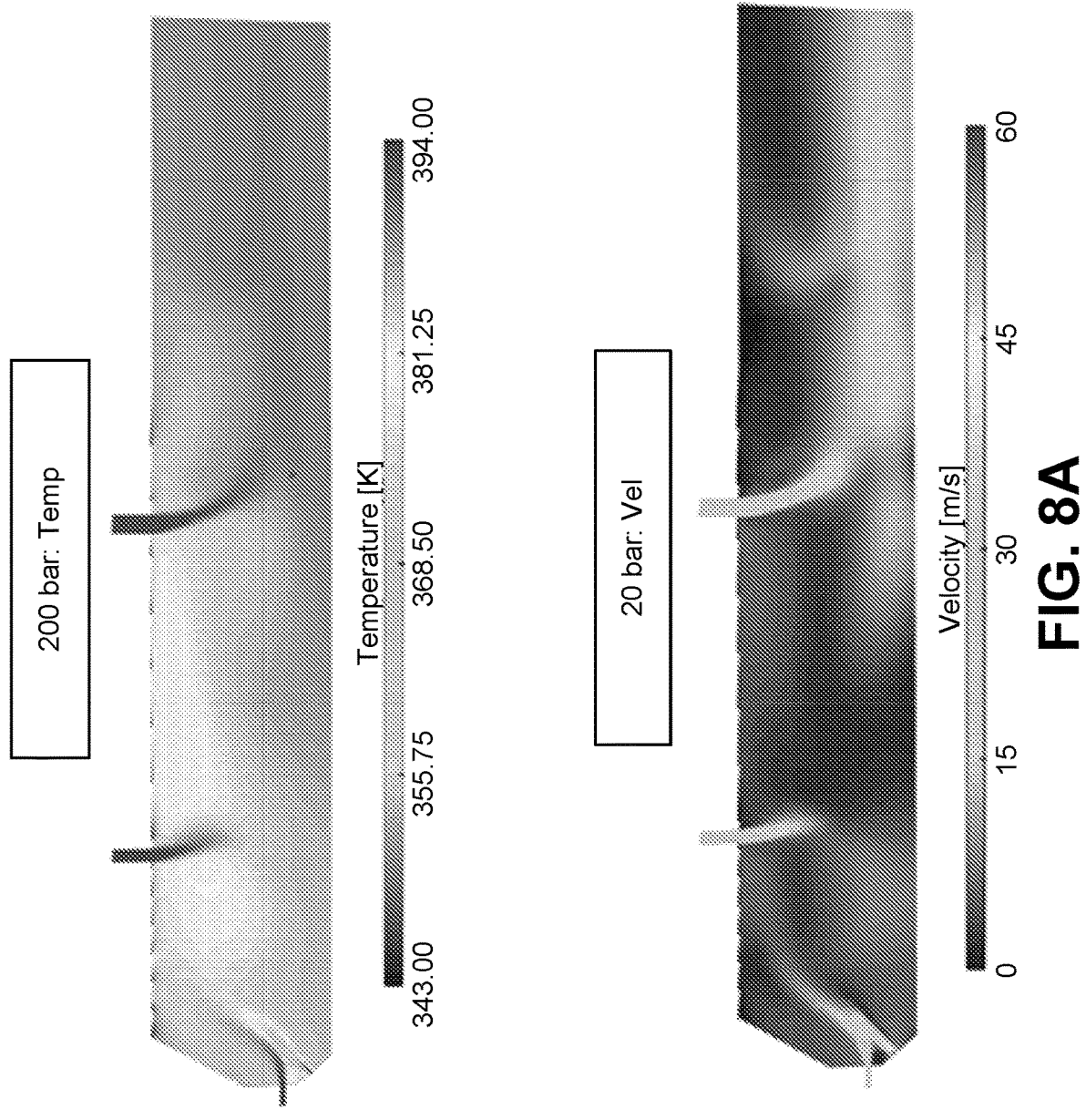
FIG. 8A depicts steady state fields for temperature and velocity at 20 bar for a given combustor geometry and fuel/oxidizer/dilution injection conditions, in accordance with features of the present invention.
Figure 8B:
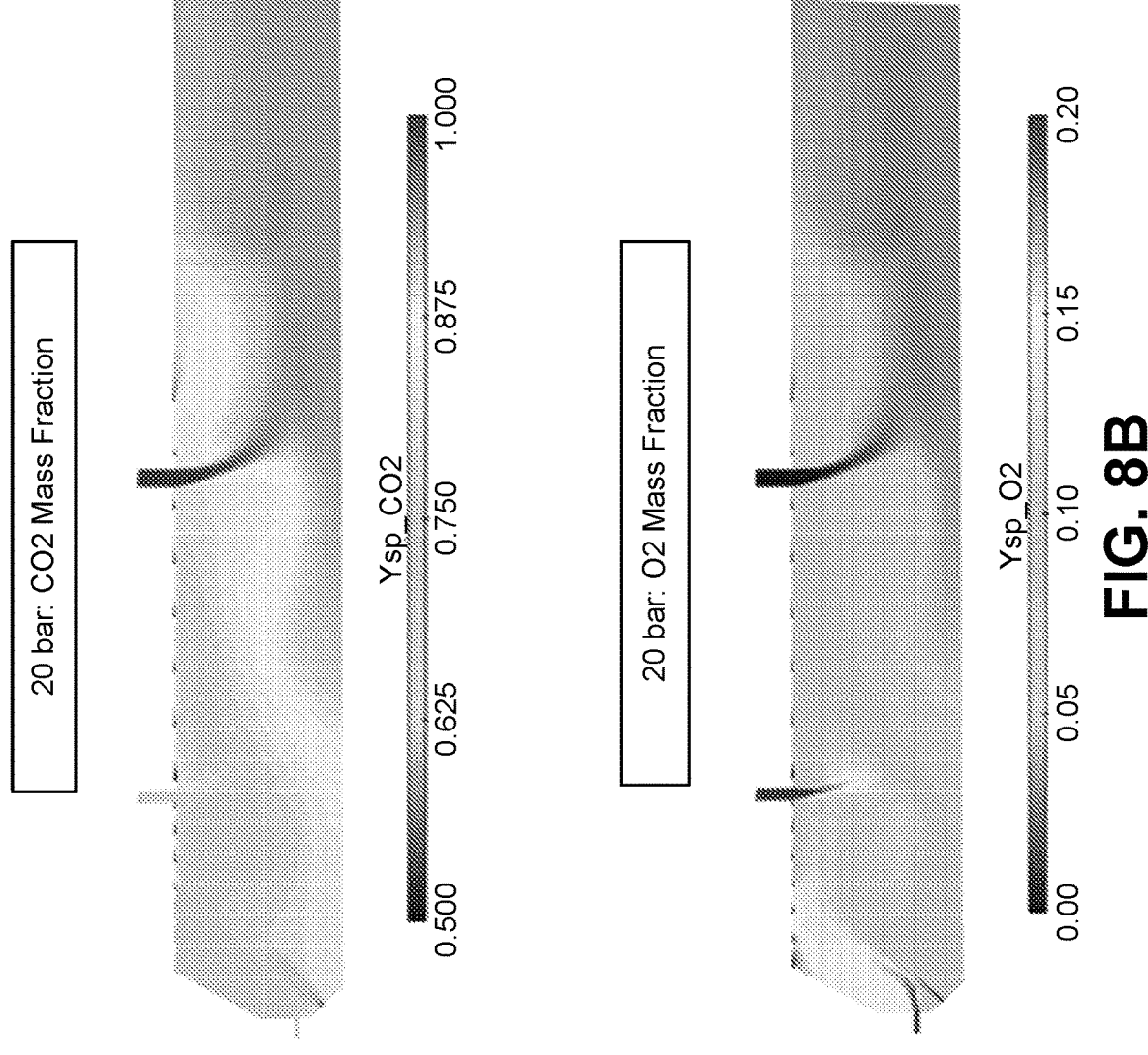
FIG. 8B depicts $CO_2$ concentrations and $O_2$ concentrations at 20 bar for a given combustor geometry and fuel/oxidizer/dilution injection conditions, in accordance with features of the present invention.

FIG. 8A depicts steady state fields for temperature and velocity at 20 bar for a given combustor geometry and fuel/oxidizer/dilution injection condition. FIG. 8B depicts $CO_2$ concentrations and $O_2$ concentrations at 20 bar for a given combustor geometry and fuel/oxidizer/dilution injection conditions.

Subsequently, the inventors evaluated the suitability of a certain geometric location by placing a "hot zone", i.e., a zone with localized temperatures >2000 K. Such an exercise helped to identify potential locations for the ignition kernel, and in addition provided physical design targets for the igniter. For an igniter placed on the casing in a radial direction, the pressure retaining window/lens can at best be placed somewhere between the liner and the casing inner wall. An exemplary focusing optic in this instance has a focal length between 50 mm and 165 mm.

With focal length and the operational envelope estimated from the CFD effort, the laser igniter was fine-tuned through several iterations of the optical, mechanical and thermal designs. A larger laser, i.e., with a larger energy/pulse was used to accommodate focusing and creating a spark at distances up to 165 mm (from the outer diameter of the combustor vessel). Also, the igniter incorporated an outer tube affixed to the combustor casing, and an inner tube attached to the front of the laser. The distal end of the outer tube carried a sapphire lens with appropriate sealing arrangement. A telescopic arrangement between the outer tube and inner tube allowed alignment of the laser beam with the sapphire lens, and further allowed easy installation on the combustor. The laser itself was a pulsed laser capable of emitting 5 nano-second (ns) pulses with pulse energies above 40 mJ/pulse. An exemplary laser is a solid-state Nd:YLF (yttrium-lithiumlfluoride crystal) capable of emitting 1053 nm pulses having 5 ns pulse width and energy of 60 mJ/pulse. Another exemplary laser is a pulsed Nd:YAG (yttrium aluminum garnet) laser having pulse widths 5-25 ns wide.

Example

As mentioned earlier, for a given fuel-oxidizer mixture, the local pressure, temperature, equivalence ratio and velocity determine whether a plasma kernel generated by focusing the laser will transform itself into a successful flame front. To limit experimental complexity in evaluating the performance of the laser igniter, the temperature of the initial fuel-oxidizer mixture was fixed at room temperature, and the velocity was chosen to be 0 m/s. Hence a quiescent chamber (test chamber) carrying a sapphire window 28 rated to 294 bar pressure was chosen as the test platform.

Premixed gaseous mixtures for oxidizer and fuel were supplied by cylinders and metered by 50 micron orifices into a mixing chamber rated to 344 bar. The premixed fuel-oxidizer mixture was allowed to homogenize over 10 minutes before directing it into the static test chamber. After establishing the fuel-oxidizer mixture into the test chamber, the mixture was ignited by activating the laser igniter. Using the 12.5 mm×254 mm optical access provided by the sapphire window 28, an ICCD camera (Princeton Instruments IMAX) placed orthogonally captured images with an exposure of one micro second following laser incidence. A polycarbonate filter (an exemplary filter is the ACRX-6NDY, Kentek, Boscawen, NH) filtered scattered laser radiation while allowing the broadband emission from the plasma kernel to be captured.

Figure 9:
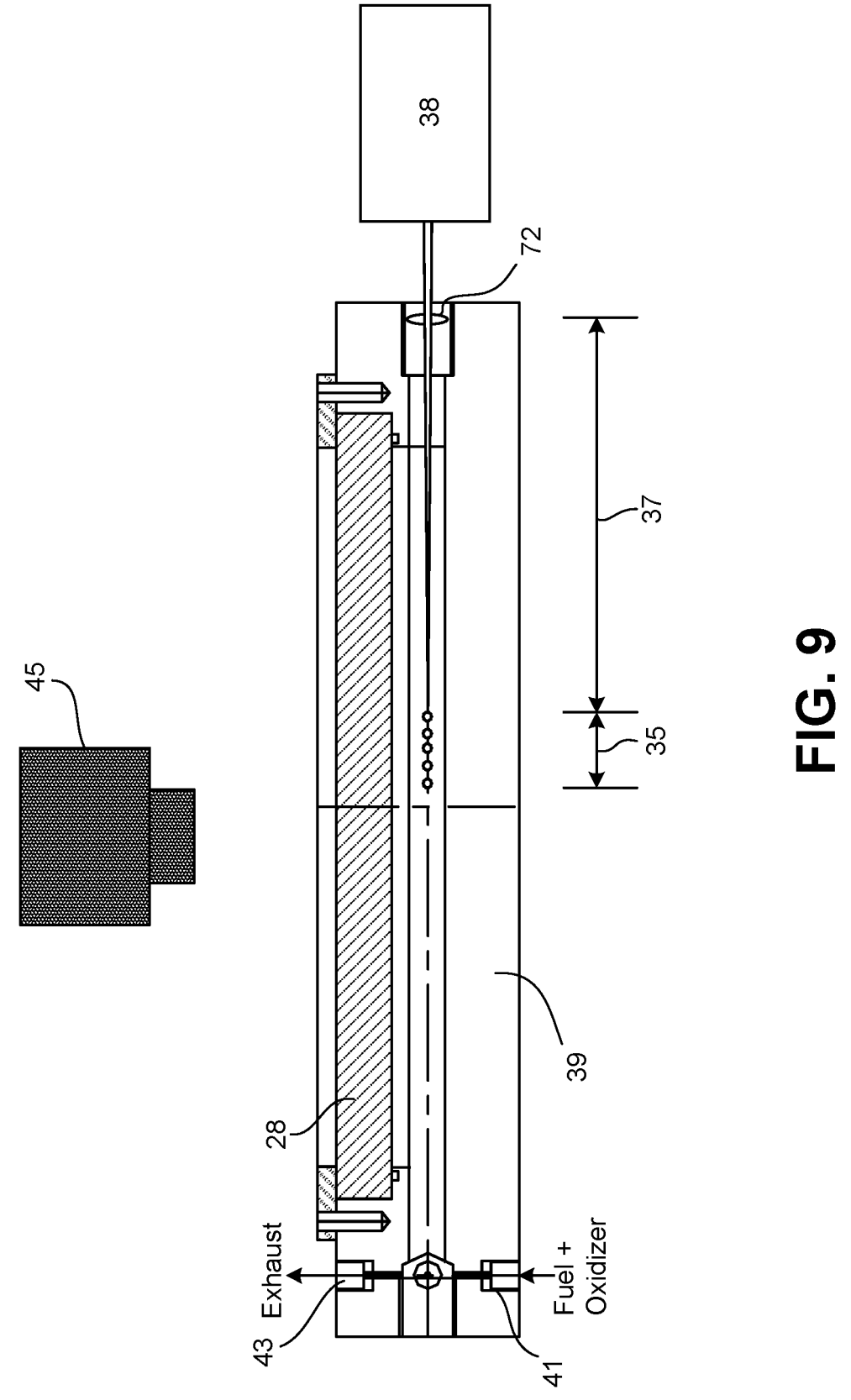
FIG. 9 is a schematic diagram of the laser combustion ignition system, in accordance with features of the present invention.

FIG. 9 shows an exemplary static test combustion chamber 39. It is fabricated out of a block of titanium and rated to a working pressure of 294 bar. Also shown are a multitude of solenoid valves, orifices and pressure transducers which facilitated fluid exchange through a plurality of ports formed along longitudinally extending regions of the chamber. For example, an ingress port 41 for both the fuel and oxidizer fluids is shown combined as one passage and situated at the downstream end of the chamber. (A positive lens 72 is positioned at the upstream end of the chamber and coaxial to the longitudinal axis of the chamber.) In this instance, fuel and oxidizer is premixed in a separate chamber and then the mixture is introduced into the chamber through the single ingress port. Opposing this ingress port 41 is an egress port 43 for exhaust gases and combustion products. In this embodiment, the laser passes between the ingress and egress ports. In another embodiment, a fuel ingress port may oppose an oxidizer ingress port such that the laser beam may pass between the two ports.

The chamber consisted of a 12 mm wide U-shaped cavity along its length. A 12 mm thick and oblong sapphire window 28 was placed on one side of the test chamber, and mated with the chamber via an O-ring seal. This window provided optical access for the laser-initiated gas breakdown to be imaged using an Intensified CCD camera 45

While using a lens of focal length=150 mm, pressure sweeps and equivalence ratio sweeps were performed. For a single laser pulse, multiple (up to a dozen) plasma kernels were observed along the path of the laser beam close to the focal point. The plasma kernels at a distance 35 (e.g., 140 mm) from the positive lens 72 were spread out over a longitudinal length 37 (e.g., 26 mm) and their specific locations changed with every shot. The inset in FIG. 9 shows a composite image of 20 laser shots which exhibits the wide spatial range over which plasma kernels occur.

This spatial distribution of the plasma obtained significantly improves the ignition probability. As the gas density increases smaller plasma kernels form along the path of the laser beam. At higher densities, beam attenuation due to absorption and scattering results in lesser laser fluences ($<2\times10^{10}$ Watts/cm$^2$) close to the focal point. As discussed supra, the probability of gas breakdown increases as the interaction between gas molecules and the incoming laser photons increases.

It was found that rich mixtures have smaller diluent $CO_2$ concentrations whereas the lean mixtures have higher $CO_2$ concentrations. For example, an equivalence ratio=0.3 results in the gas mixture having $CO_2$ concentration of 68 vol. %, whereas an equivalence ratio=1.5 results in the gas mixture having $CO_2$ concentration of 48 vol. percent. This results in rich mixtures being easily ignitable as compared to the lean mixtures. The test show that the lean ignition limit ~0.7, whereas the rich ignition limit >1.6. This offers the possibility of improving ignitability in the combustor by placing the ignition kernel in fuel rich locations. (This is the case with the specific syn-gas that was used in the experiment. Rich mixtures might not be ignitable while using a different gaseous fuel, say, natural gas.)

Variable Focal
Length Configuration

Typically, an $sCO_2$ combustor is started at relatively low pressures (e.g., less than 20 bar) and ramped up towards higher load. During this ramp up, the index of refraction of the fluid in the $sCO_2$ combustor varies. The focal length of the laser may vary with the pressure of the combustion chamber.

For example, $CO_2$, whose volume fraction can reach levels up to 70 percent, exhibits substantial variation of both linear and non-linear indices of refraction with pressure. This in turn results in focal length varying significantly over the range of operable pressures (typically between 20 bar and 300 bar) inside the $sCO_2$ combustor.

State of the art efforts rely on detailed CFD simulations to identify ideal locations for placement of ignition kernels within the flow field of the $sCO_2$ combustor. Though ignitors carrying optics of fixed geometry can be placed through penetrations in the combustor walls, the variation of index of refraction of the fluid makes it difficult to accurately place the plasma kernel (e.g., the ignition kernel) in those locations satisfying the ignition criteria based on CFD simulations.

The variable focus embodiment of the invention improves ignition probability in laser induced combustion scenarios. It expands the operating envelope of the combustor in terms of operation pressure and mixture composition and can accommodate compositional variation of natural gas or syngas typically used in $sCO_2$ combustors. The salient features of this embodiment include the following:

A combination of a positive lens and a negative lens whose effective focal length (EFL) can be varied by varying the distance between the lenses.

Using relatively long EFL to facilitate the formation of multiple ignition kernels along the optical axis (i.e., spatially distributed ignition).

Using multiple laser pulses in succession (pulse train) to increase temporal ignition kernel distribution, and thereby improve ignition probability.

Scanning the EFL by mechanically varying the distance between the lenses during the emission of the pulse train, thereby effectively facilitating the spread of the plasma kernels over a larger spatial region, thus improving ignition probability.

The variable focal length embodiment of the invention enables ignition under high pressures and high-dilution conditions encountered in $sCO_2$ combustors. As laser energy facilitates easier ignition under high-pressure conditions, the system restart times are shortened significantly in the event of a flame blow off. Also, with improved reliability, the $sCO_2$ power plants can be operated in a load-following manner.

Variable focus enables the firing a burst of laser pulses and scanning the EFL of the lens. This in turn places the ignition kernel at a number of locations and increases the probably of ignition.

The variable focal length laser ignition system can also enhance the range of operability of other advanced combustion devices, such as scramjets and other propulsive devices.

Figure 11:
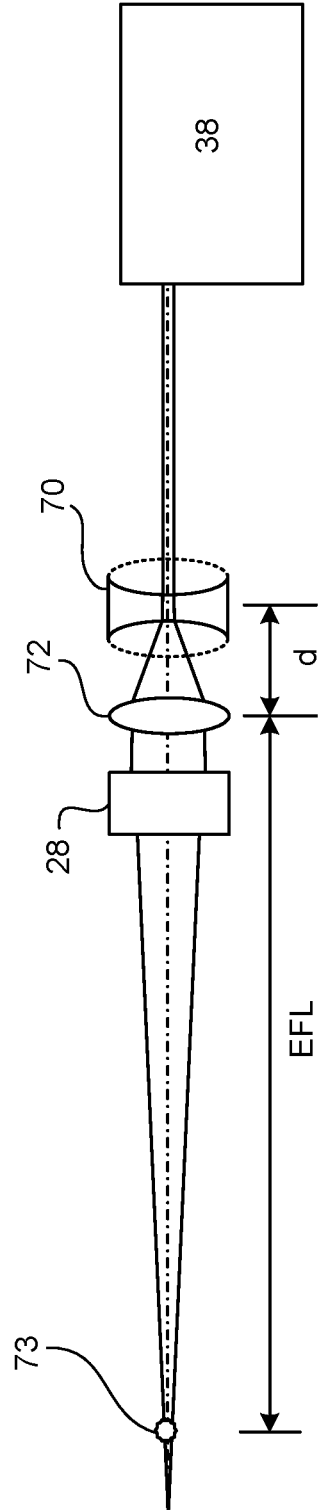
FIG. 11 is a schematic diagram depicting a configuration for varying the focal length of a laser, in accordance with features of the present invention.

FIG. 11 is a schematic diagram depicting the optical arrangement for varying the Effective Focal Length (EFL) of the laser, a distance between a positive lens 72, and an ignition plasma kernel 73. A feature of this configuration is that a negative lens 70 is moved axially using a mechanical arrangement to vary the distance d between a positive lens 72 and the negative lens 70. The figure shows the negative lens 70 positioned between the laser head (laser light source) 38 and the positive lens 72.

Alternatively, the positive lens and the sapphire window, positioned downstream from the positive lens, may be moved in tandem. In this instance, the negative lens remains stationary. "Positive" and "negative" lens designations indicate the topography of the lenses themselves. The focal length of a concave surface is negative, whereas the focal length of a convex surface is positive. The focal length, f, is positive for a converging object (concave mirror or convex lens), and negative for a diverging object (convex mirror or concave lens). Therefore, for a lens, the power of a concave and convex lens is negative and positive respectively.

The positive and negative lenses may be mounted on the same track so as to be concentrically arranged with each other. A plurality of mirrors may be utilized to direct the laser beam to the negative lens. This mirror iteration may be necessary in instances were space is a premium.

In operation, a combustion chamber is first charged with fuel-oxidizer mixture. Then, the laser is applied at various regions within the combustion chamber at different focal lengths to place plasma kernels throughout the chamber to enhance ignition probability. Within a span of 60 secs, the laser may change focal lengths 30 times.

In one embodiment of the invention, the focal length changes to optimize laser exposure to areas of the combustor where known concentrations of fuel exist. In another embodiment, the focal length changes to optimize chances of igniting fuel concentrated in different regions of the combustion chamber.

Example

Figure 12A:
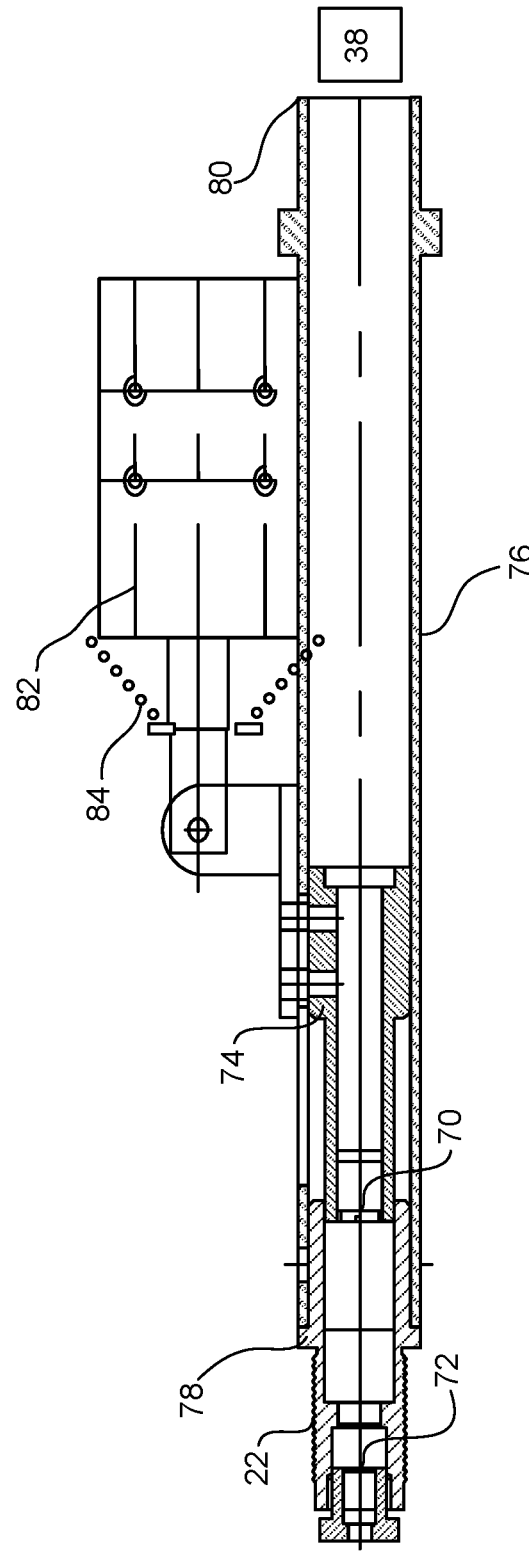
FIG. 12A is a cross sectional view of a solenoid actuated laser unit, in accordance with features of the present invention.

FIG. 12A is a cross sectional view of an exemplary variable focal point laser configuration. As depicted in FIGS. 9 and 11, the laser 38 is shown originating from the right in FIG. 12A.

The negative lens 70 is positioned between the laser 38 and the positive lens 72. The negative lens 70 is mounted on a downstream end of a carrier or shuttle 74, the carrier slidably received by the thimble or housing 76 of the laser focusing assembly and coaxial with the longitudinal axis of the housing 76.

The shuttle 74 may be spring biased toward the downstream end 78 of the nacelle 76 and activated toward the upstream end 80 of the nacelle by a solenoid 82. As shown, the carrier is positioned to the left and a spring 84 is compressed when the solenoid is activated. FIG. 12 shows the downstream end of the thimble defining male-threaded surfaces 22, as discussed supra, for mating the nacelle with a female threaded aperture formed in a region of the combustion chamber housing wall.

The solenoid enables an infinite focal point to the laser beam. The focal point may be varied according to the fuel nodes periodically calculated to exist in various regions of the combustion chamber, those nodes depicted in FIGS. 4A and 4B. As such, the focal points may vary, and depending on the limitations of the particular laser utilized. Commercially available lasers utilized by the inventors can enable focal points to be varied within a few (e.g., 20) milliseconds. For example, the inventors have found that the time for the shuttle 74 to travel a length of 25 mm was approximately 50 milliseconds (ms). The spring return time was also 50 ms. Exemplary lasers are solid-state Nd:YLF or Nd:YAG laser, with typical pulse width of <7 ns, energy per pulse >60 mJ/pulse, high beam quality, and burst mode at PRF≥50 HZ.

Figure 12B:
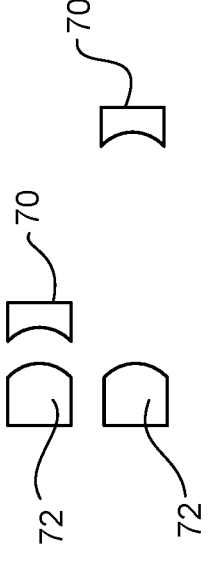
FIG. 12B is a schematic depiction of placement of positive and negative lenses via a solenoid, in accordance with features of the present invention.
Figure 12B:

Alternatively, and as depicted in FIG. 12B, the focal length of the laser may be preset, depending on the location of the fuel ingress points. For example, the focal point may be 300 mm with the solenoid off, and 150 mm with the solenoid on and with the positive lens 70 and negative lens 72 separated by 25 mm.

Focal Length
Optimization Detail

Another important factor in design is proper calculation for optimal focal lengths given the negative and positive lenses, to wit: $+f_p$=focal length of the positive (+ve) lens, $-f_n$=focal length of the negative lens, and d=the separation distance between them, Using thin lens approximation, one can estimate the effective focal length (f) using Equation 3 as follows:

$$\frac{1}{f} = \frac{d - (f_p - f_n)}{f_p \cdot f_n} \qquad \text{Equation 3}$$

A probable design solution exits for $f_p < f_n$, and ideally $f_n = f_p$+Max. value of d possible with the linear actuator.

The aforementioned variable laser focus feature facilitates ignition even when optimal fuel node locations are not well defined. Further, the variable focus feature provides a means to offset non-linear effects of $CO_2$. (Optical nonlinearity is a phenomenon that makes a laser beam focus at a distance shorter than the focal length of the lens. In the absence of non-linearity (as at 21 bar) the spatial distribution of ignition kernels by variable focus arrangement is clearly evident.) This is particularly applicable at pressures above 20 bar, and typically between 40 bar and 100 bar.

Figure 13:
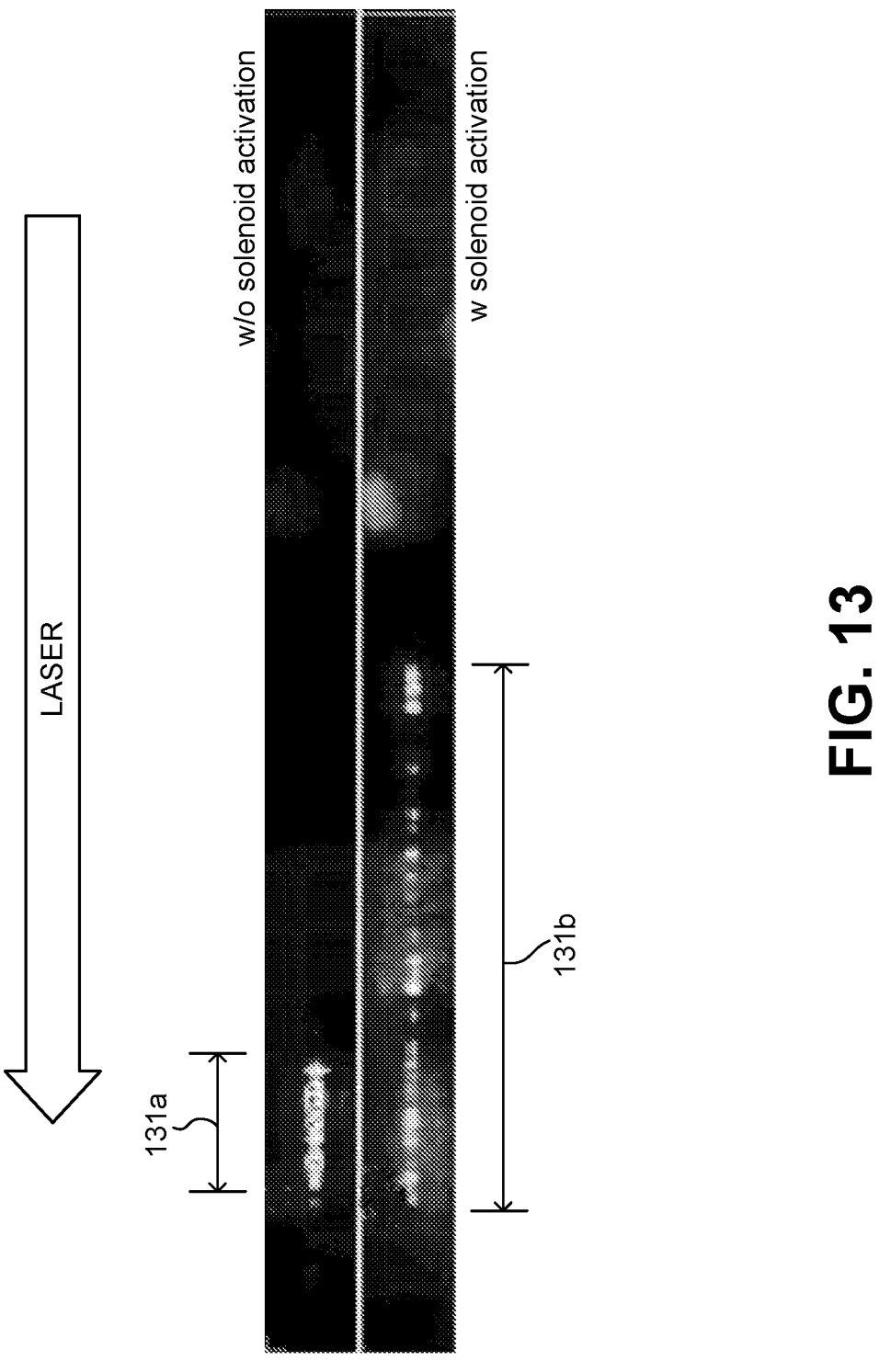
FIG. 13 compares flame kernel dispersions in static-versus solenoid actuated-laser systems, in accordance with features of the present invention.

FIG. 13 shows ignition points along interior regions of a combustion chamber. Seven pulses of 50 Hz laser bursts were provided in situations where a solenoid was not employed and then where a solenoid was employed, the latter to vary the focal length of the lasers. As in the schematic figures discussed supra, the laser beam is traveling from right to left in the figure.

A top panel shows a tightly grouped agglomeration of fuel ignition points along a first ignition point distribution 131a (e.g., 28 mm). That the ignition points are tightly grouped is the effect of a laser source with a fixed focal point. In this instance, the system is not utilizing a solenoid for varying focal length.

A bottom panel of FIG. 13 shows ignition points along a second ignition point distribution 131b (e.g., 98 mm) of the combustion chamber. This 3.5 fold spatial spread in ignition kernels compared to the first color panel is indicative of solenoid activation, wherein the negative lens is actuated to the right, toward the laser source. This bottom panel shows how focal point variability provides a means for increasing instances of ignition within a combustion chamber. Spatially distributed ignition kernels improve the probability of ignition.

FIG. 13 also shows that at 21 bar pressure, in $CO_2$, non-linear effects are less pronounced.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all sub ratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. A method for igniting pressurized fuel, the method comprising:
   a) placing fuel into a combustion chamber;
   b) mixing the fuel with supercritical carbon dioxide and oxidizer to create a fuel-oxidizer mixture;
   c) aligning a laser head with an axis of a lens disposed in an outer tube of an elongated housing, wherein a portion of an inner tube is disposed in the outer tube and a portion of the inner tube is exterior to the outer tube;
   d) physically decoupling the inner tube from the laser head subsequent to aligning the laser head with the axis of the lens by telescoping the portion of the inner tube exterior to the outer tube into the outer tube, wherein heat transfer back to the laser head is reduced; and e) contacting the mixture with a first laser beam emitted by the laser head, whereby the first laser beam is pointed to a first point within the chamber for a first period of time.

2. The method as recited in claim 1, wherein the first laser beam is constant.

3. The method as recited in claim 1, wherein the first laser beam is not constant.

4. The method as recited in claim 1, comprising: changing focus of the first laser beam to a plurality of points throughout the combustion chamber over time.

5. The method as recited in claim 1, wherein a temperature of the combustion chamber is between 20° C. and 800° C.

6. The method as recited in claim 1, wherein a second laser is pointed to a second point within the chamber.

7. The method as recited in claim 1, wherein no physical hardware associated with the first laser beam protrudes into the chamber.

8. The method as recited in claim 1, wherein the first point comprises a first node of the fuel-oxidizer mixture within the chamber.

9. The method as recited in claim 6, wherein the second point comprises a second node of the fuel-oxidizer mixture within the chamber.

10. The method as recited in claim 1, wherein the first point comprises a first physical surface within the chamber.

11. The method as recited in claim 6, wherein the second point comprises a second physical surface within the chamber.

12. The method as recited in claim 1, comprising:

using a plurality of laser pulses in succession to increase temporal ignition kernel distribution and improve ignition probability.

\* \* \* \* \*